Jan. 12, 1943. J. E. UNDERWOOD 2,308,218
MOWER
Filed Dec. 27, 1940
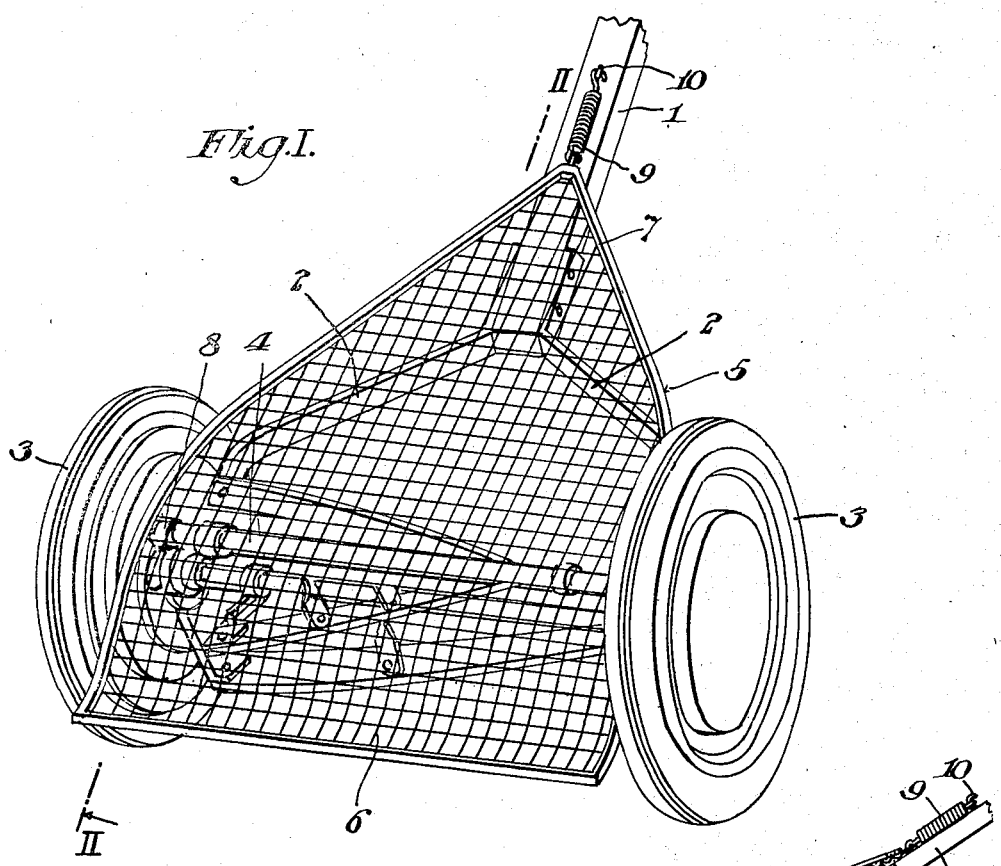
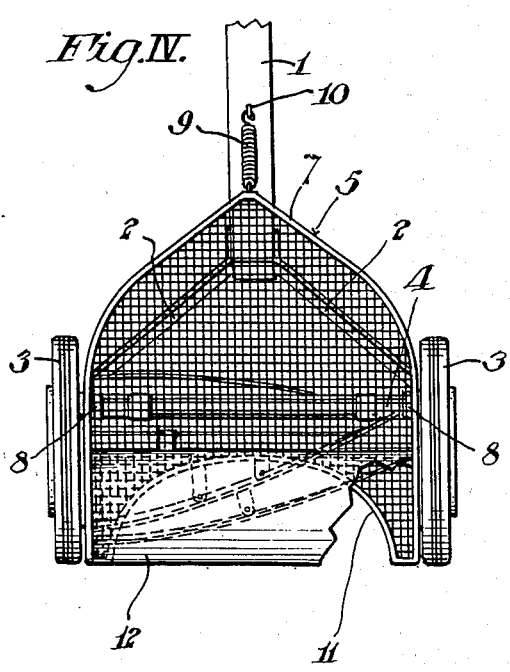
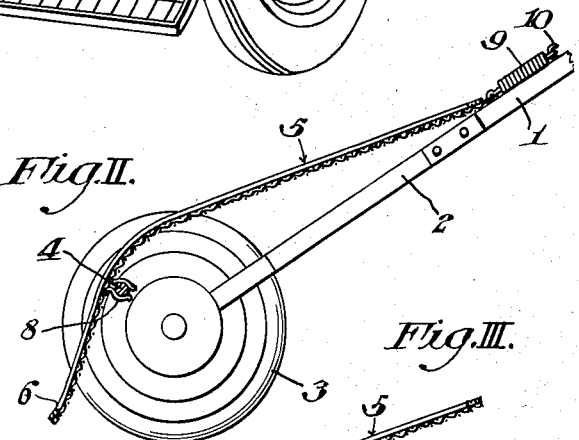
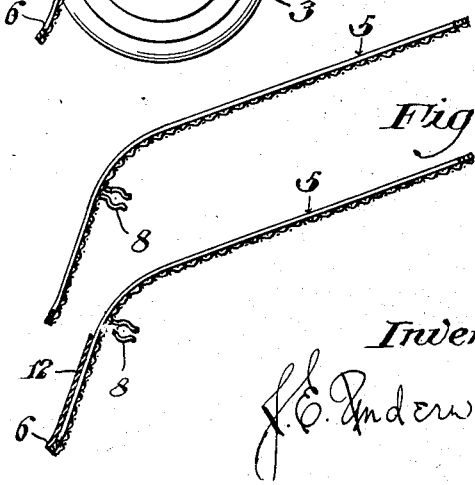
Inventor
J. E. Underwood Patented Jan. 12, 1943

2,308,218

UNITED STATES PATENT OFFICE 2,308,218

MOWER

Julius E. Underwood, Wallingford, Pa.

Application December 27, 1940, Serial No. 371,897

2 Claims. (Cl. 56—249)

This invention relates to an improvement in mowers.

It is well known that, when using a lawn-mower to cut under hanging branches of trees, bushes and other forms of vegetation, it is impossible to mow effectively because of interference from such branches and vegetation. On the one hand, the mower blades tend to destroy the branches or bushes while, on the other hand, the operation of the mower is impeded.

An object of this invention is to provide means for protecting branches of trees and bushes while using a mower in close proximity thereto.

Another object contemplated by this invention is to provide means for preventing the entanglement of low-hanging branches or bushes with the various parts of the mower, especially the blades and wheels, when mowing in close proximity thereto.

A further object of the invention provides means for the easy mounting of the protective measure, either temporarily or permanently.

To carry out the objects of this invention, I have provided an improvement for mowers, comprising a lifting element or fender adapted to lift or fend low-hanging branches of trees or bushes and the like from the path of said mower. The fending element may be directly built in or attached to the body of the mower in a low frontal position thereof.

Whether the lifting element is directly built in or attached to the mower, it may be so attached that it will assume a desired angle to the vertical or horizontal or both, depending upon the direction of thrust of the branches acting upon it as they are approached with the mower.

The lifting element comprises a plate, screen or other satisfactory material of a size sufficient to shield the lower portion of the handle and all of the cutting mechanism. This plate or screen may be equipped with a supporting frame. The frame may be suitably shaped for approaching branches, etc. and the bottom of the frame may be resiliently deformable to allow closer approach to tree trunks, etc.

Further objects and advantages of my invention will become apparent from the accompanying drawing, given by way of illustration of a form of the device as applied to a lawn-mower. It will be understood that this invention is applicable to forms of cutters other than lawn-mowers.

In the drawing,

Fig. I is a view in perspective of a lawn-mower with the lifting element attached thereto.

Fig. II is a cross sectional view of Fig. I taken along the line II—II.

Fig. III is a cross sectional view of the fending element.

Fig. IV shows the guard element equipped with a resiliently deformable lower end.

Fig. V is a cross sectional view showing the resilient material attached to the lower end of the fender.

With reference to the several figures of the drawing, number 1 indicates the handle of the lawn-mower comprising a frame 2. To this frame are attached the cutting knives and wheels 3. Between the wheels 3 is located a spacer bar 4.

Referring particularly to Figs. II, III and V, numeral 5 denotes the guard element which is attached to the mower permanently or, as shown, temporarily, by means of snap-brackets 8 adapted to fit on spacer bar 4 and by flexible member 9 and hook 10 to handle 1.

The fender or guard element 5 is formed preferably as shown and constructed by incorporation of a sheet, plate or screen into frame 7. The lower portion of the fender 6 may be curved in any suitable manner to allow for operation close to fixed objects.

Referring now to Fig. IV, when it is desired, the lower portion of the guard element may be cut away as shown at 11. When thus shaped, the guard element will permit a closer approach of the objects protected.

In order to avoid sudden impacts which may injure the object struck as well as the mower, the guard element is preferably equipped with a resiliently deformable lower portion 6 or with a resilient protective element 12. Element 12 may be of rubber, leather or any other suitable resiliently deformable material.

Although element 12 is shown to cover and, to a certain degree, replace the portion of the guard which has been cut away, it is within the scope of the invention to place such resilient protective coating on the leading edge of the guard with or without cutting away any portion thereof.

It will be understood that, while a lawn-mower is illustrated and described, this invention is applicable to all mowers where the blades are to be prevented from coming into direct contact with branches of trees, trees, bushes, etc. The invention contemplated in this disclosure can be made to serve the purpose of removing twigs and other obstacles from the path of a mower.

There are other obvious ways of attaching the guard element and it may be attached, in some cases, behind the spacer bar. In fact, where no spacer bar is to be found, the fending element may be attached to the housing which protects the blade-driving mechanism.

It will be obvious from the foregoing, as well as from the claims, that embodiments of the invention will allow, for example, the cutting of the edge of a lawn which may be situated beneath low-hanging branches of trees or bushes, without having to perform the usual trimming operation.

Having now particularly described my invention, what I desire to secure by Letters Patent is:

1. In combination with a mower comprising a frame a spacer bar moving means and a handle a fender element for said mower; said element having a supporting frame; said frame being supported by said spacer bar; a screen held securely in said frame and extending in a rearwardly inclined direction from a point at the front of said moving means and adjacent the ground to a point above and to the rear of said means; and means attaching said frame to the handle.

2. In combination with a mower comprising a frame a spacer bar mowing means and a handle a fender element for said mower; said element having a defining frame the limits of which extend to shield said mowing means; said frame being supported by said spacer bar; a shield held securely in said frame and extending in a rearwardly inclined direction from a point at the front of said mowing means and adjacent the ground to a point above and to the rear of said means; said frame being curved upward and forward at the lower part thereof; and means attaching said frame to the handle.

JULIUS E. UNDERWOOD.